May 1, 1962

A. DAVIS 3,032,744

ELECTRONIC COMPUTER FOR SOUND RANGING SYSTEM

Filed May 6, 1958

INVENTOR.
ALFRED DAVIS
BY
Harry M. Saragovitz
ATTORNEY

INVENTOR,
ALFRED DAVIS

United States Patent Office 3,032,744
Patented May 1, 1962

3,032,744
ELECTRONIC COMPUTER FOR SOUND RANGING SYSTEM
Alfred Davis, Little Silver, N.J., assignor to the United States of America as represented by the Secretary of the Army
Filed May 6, 1958, Ser. No. 733,457
4 Claims. (Cl. 340—16)
(Granted under Title 35, U.S. Code (1952), sec. 266)

The invention described herein may be manufactured and used by or for the Gorvernment for governmental purposes, without the payment to me of any royalty thereon.

This invention relates to sound ranging systems and more particularly to an electronic vector computer for a sound ranging azimuth detector.

In azimuth measuring units designed to record the sound of artillery fire or shell detonators, the azimuth from which the sound originated may be determined from the playback of records. Such a system may comprise four movable playback heads so arranged that the amount of relative displacement of the playback heads is proportional to the difference in time of arrival of the sound wave front to a plurality of microphones placed in a definite geometrical array. While mechanical type vector computers have been used to convert this relative displacement into a reading of the azimuth of sound arrival, they have proved to be rather complex, fragile, extremely difficult to adjust, too bulky and not too accurate under actual operating conditions. A suitable cathode-ray tube indicator is usually provided in such systems to provide a display of the recorded signals detected by each microphone. When the individual displays are aligned into register, it is an indication that the amounts of relative displacement of the playback heads are proportional to the difference in time of arrival of the sound wave front over the microphone array.

It is an object of the present invention to electronically convert these relative displacements into a reading of the azimuth of the sound arrival and to present such a reading on the above-mentioned cathode-ray indicator.

It is another object of the present invention to provide an electronic vector computer for automatically determining the azimuth from which the sounds originated, once the individual displays have been aligned into register.

Briefly, the present invention is adapted to operate with a sound ranging system having a cruciform microphone array and which includes means for recording the arrival of sounds wherein the azimuth is a function of the relative angular displacement of two pairs of playback heads and further includes a cathode-ray tube indicator and means for presenting the discrete outputs of the playback heads on the cathode-ray tube indicator such that when the outputs are in alignment thereon, the amounts of the relative displacement of each pair of playback heads are proportional to the difference in time of arrival of a sound wave front to the individual microphones of the array. In accordance with present invention, there is provided an electrical computer for converting the relative displacements to a reading of azimuth of sound arrival on the cathode-ray tube indicator. The computer comprises means for generating discrete direct-current voltages proportional respectively to the relative angular displacement of one pair of playback heads and the relative angular displacement of the other of the playback heads, and switch means for applying the discrete direct-current potentials to the cathode-ray tube indicator after the above-mentioned alignment is produced thereon whereby the vector sum of the two discrete potentials is presented on the cathode-ray tube indicator to indicate the azimuth of sound arrival.

For a better understanding of the invention, together with other and further objects thereof, reference is had to the following description taken in connection with the accompanying drawings in which:

FIG. 1 schematically illustrates a cruciform microphone array;

Figures 1, 2:
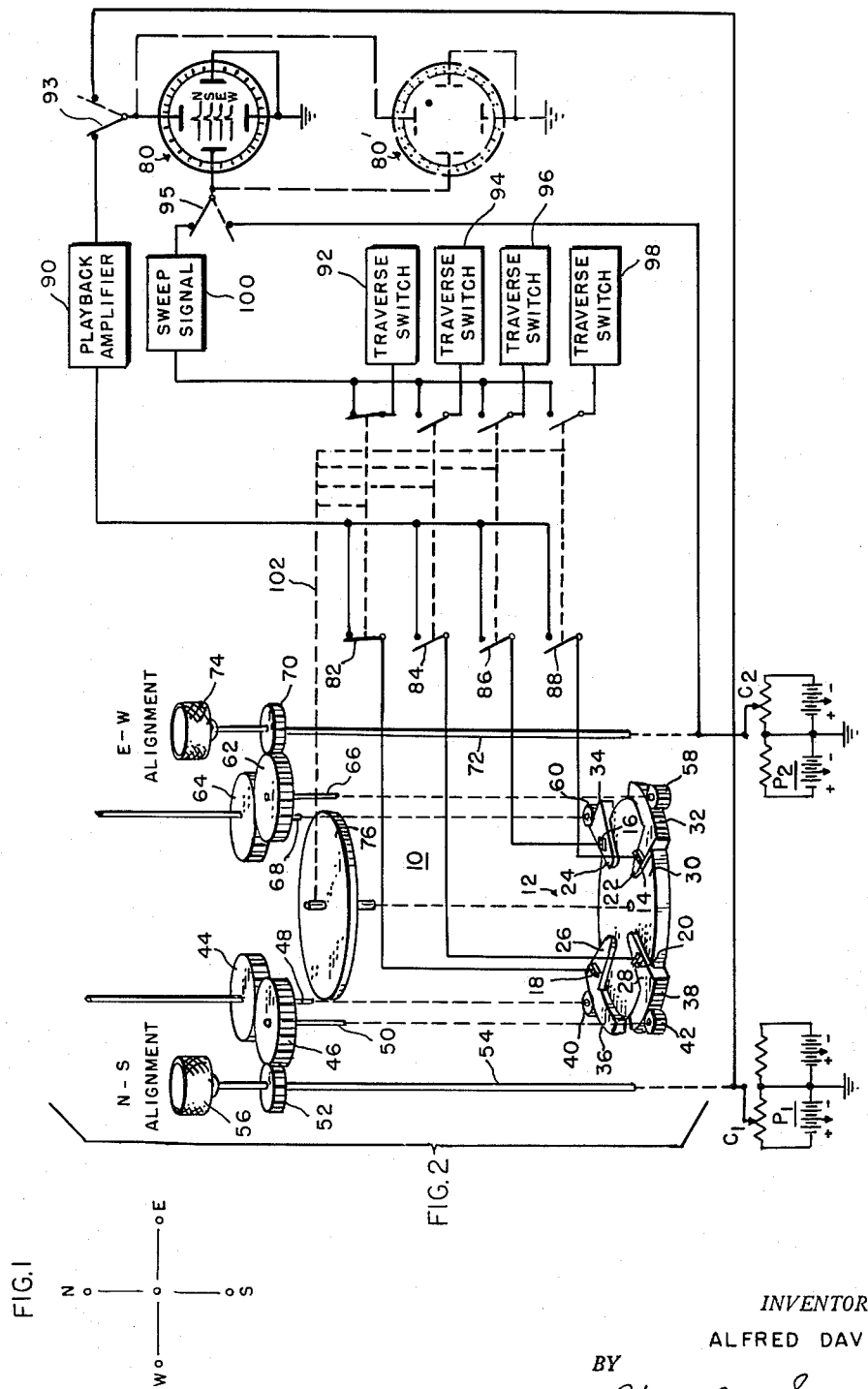
FIG. 2 is a schematic representation illustrating the embodiment of the invention in a sound ranging system.
FIG. 1 shows a cruciform microphone array used with a sound ranging system wherein the "on-target" position is determined by viewing the simultaneous alignment of the signals from the north, west, east, and south playback heads on a cathode-ray tube. One such system will now be described in order to bettter understand the present invention.

Referring now to FIG. 2 of the drawing, there is shown at 10 a computer assembly adapted to operate in conjunction with a record playback assembly 12 including four playback heads 14, 16, 18, and 20 affixed to and extending upwardly from respective movable mountings 22, 24, 26, and 28 rotatably mounted about the axis of revolution of horizontally disposed support disk 30. For convenience, heads 14 and 16 may be designated as the east-west playback heads and heads 18 and 20 may be designated as the north-south playback heads. Each of said mountings is provided with a circumferentially disposed spur gear shown respectively at 32, 34, 36 and 38. North-south playback heads 18 and 20 may be rotatably displaced in opposite angular directions along the periphery of disk 30 by pinion gears 40 and 42 which are respectively driven by meshed spur gears 44 and 46. As shown, pinion gear 40 and spur gear 44 are mounted on vertical shaft 48 and pinion gear 42 and spur gear 46 are mounted on vertical shaft 50. Gear 46 meshes with pinion gear 52 which is mounted on north-south alignment shaft 54, the upper end of shaft 54 being terminated by a knob 56. The gearing is so arranged that by rotating knob 56, simultaneous equal displacement of north-south playback heads 18 and 20 in opposite angular directions is achieved. East-west playback heads 14 and 16 may be rotatably displaced in opposite angular directions along the peripery of disk 30 by pinion gears 58 and 60 which are driven respectively by meshed spur gears 62 and 64. Pinion gear 58 and spur gear 62 are mounted on vertical shaft 66 and pinion gear 60 and spur gear 64 are mounted on vertical shaft 68. Gear 62 meshes with pinion 70 mounted on east-west control shaft 72, the upper end of control shaft 72 being terminated by knob 74. By this arrangement, simultaneous equal displacement of east-west heads 14 and 16 in opposite angular directions may be achieved by rotating knob 74. A conventional rotatably driven plastic recording surface 76, on which is recorded the sound to be located, is in contact with the four playback heads and the amount of the relative angular displacement of the heads may be limited to an angle corresponding to a half-second of recording time by any suitable means well known in the art.

The output of each of the playback heads 14–20 are applied in sequence to the vertical deflection plates of cathode-ray tube indicator 80 by means of respective commutator reed switches 82, 84, 86 and 88, playback amplifier 90 and switch 93 when in the position shown by the solid line. At the same time a sweep trace voltage is provided at the horizontal plates of cathode ray tube indicator 80 by means of respective electromagnetic-head traverse switches represented by blocks 92, 94, 96 and 98. As shown in the drawing, commutator reed switch 82 and its corresponding electromagnetic-head traverse switch 92 are operatively associated with north playback head 18; commutator reed switch 84 and its corresponding electromagnetic-head traverse switch 94 are operatively associated with south playback head 20; commutator reed switch 86 and its corresponding electromagnetic-head traverse switch 96 are operatively associated with west playback head 16; and commutator reed switch 88 and its corresponding electromagnetic-head traverse switch 98 are operatively associated with east playback head 14. It is to be understood that sequence of operation of the commutator reed switches is such that when one commutator reed switch is "on" all the others are "off."

Figure 3:
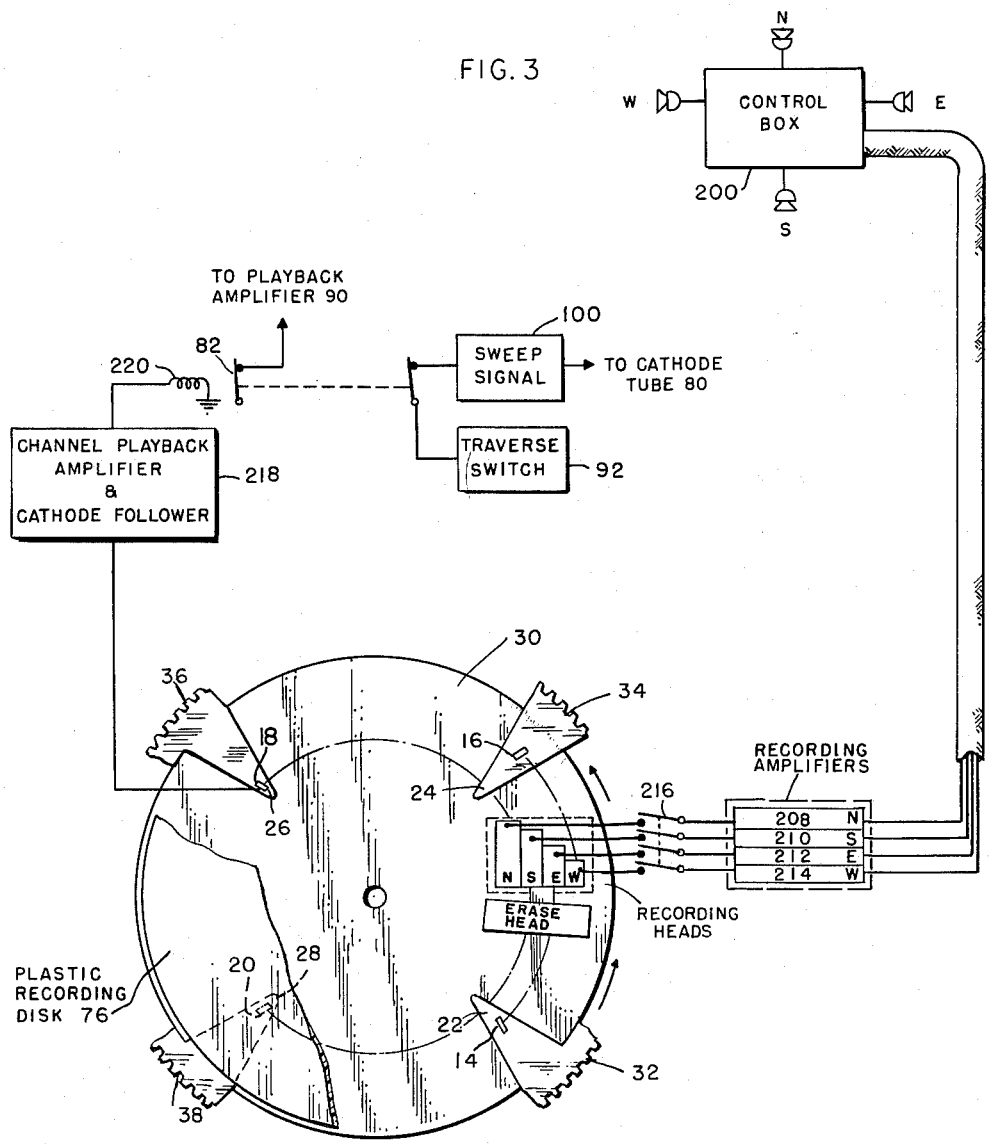
FIG. 3 is a schematic representation illustrating the operation of the record and playback function of the sound ranging system.

To better understand the operation of the sound ranging system, reference is had to FIG. 3 wherein like numbers refer to like elements. As shown therein, the four outputs from the cruciform microphone array are each individually channeled to respective recording heads through a control box 200 and associated respective recording amplifiers 208, 210, 212, and 214 and record playback ganged switch 216. As the plastic recording surface 76 passes over the recording heads, signals are recorded thereon as they are detected by the microphone array. Of course, when switch 216 is in the record or "on" position, the playback amplifier 90 (FIG. 2), a shift drive motor for playback (not shown), and the cathode-ray tube indicator 80 (FIG. 2) will be simultaneously turned off. When switch 216 is in the playback or "off" position, the playback amplifier 90, the shift drive motor for playback and the cathode-ray tube indicator 80 will be turned on. A separate playback drive motor is necessary inasmuch as the playback speed of recording surface or disk 76 is 150 times the recording frequency. As shown, the respective playback heads are radially displaced on the disk 30 such that each playback head is receptive only to the recording track produced by its associated recording head. The broken line arcs in FIG. 3 show this arrangement. Thus, as the recorded signal passes over the individual playback heads in sequence, respective outputs are derived therefrom. Each playback head channel includes an amplifier and cathode follower stage 218, the output of which energizes a relay 220 which, in turn, actuates an associated commutator reed switch and, simultaneously, the associated electromagnetic-head traverse switch is actuated. The commutator reed switch 82 and traverse switch 92 associated with playback head 18 are shown in FIG. 3 for purposes of illustration.

The commutator reed switches are so arranged with respect to the electromagnetic-head traverse switches such that at the instant a commutator reed is switched "on," its corresponding electromagnetic-head traverse switch is also energized substantially at the same instant to provide a transient signal which is applied as a trigger to sweep signal generator 100 for generating a horizontal sweep trace voltage. As shown, the output of the sweep signal generator 100 is applied to the horizontal plates of cathode-ray indicator tube 80 by means of switch 95 when in the position shown by the solid line. The simultaneous energization of a commutator reed switch and its corresponding electromagnetic-head traverse switch is accomplished by means of a rotating arm, not shown, but represented by the broken line 102, which is terminated at both ends by a small Alnico magnet and adapted to rotate in synchronism with recording surface 76. The simultaneous application of the output of each playback head to the playback amplifier 90 and that of the transient signal from each of the electromagnetic-head traverse switch to the sweep signal generator 100 is schematically shown by representing each of the commutator reed switches as comprising two ganged switch arms, one of which applies the output of a playback head to the playback amplifier 90 and the other of which applies a signal from its corresponding electromagnetic-head traverse switch to the sweep signal generator. Thus, as the commutator reed switches are closed in sequence such that when the outputs of the north, south, east and west playback heads are applied in order to the vertical plates through playback amplifier 90 and switch 93, the horizontal sweep trace voltage is also applied in sequence to the horizontal plates of cathode-ray tube indicator 80. The commutator reed switches also provide discrete direct current voltages (not shown) to the sweep voltage circuit so that the corresponding signals from the four playback heads are displayed on four separate horizontal sweep lines. As a result, with the switches 93 and 95 in the solid line position, the signals from each playback head are on applied four separate horizontal sweeps. By rotating N–S alignment knob 56 and E–W alignment knob 74, the relative angular displacements of each pair of playback heads are adjusted until the signals from the individual playback heads are aligned on cathode-ray tube indicator 80, and, when so aligned, the amounts of relative displacement of the playback heads are proportional to the difference in time of arrival of the sound wave front to the various microphones of the array shown in FIG. 1.

In accordance with the present invention, two potentiometers $P_1$ and $P_2$ are provided to produce two direct-current voltages which are respectively proportional to the rotational movement of shafts 54 and 72. Two oppositely poled direct-current voltage sources of equal values are connected across each potentiometer so that the center of each potentiometer is at zero or ground potential. The movement of center arm $C_1$ of north-south potentiometer $P_1$ is controlled through suitable gearing (not shown) by shaft 54 and the movement of center arm $C_2$ of east-west potentiometer $P_2$ is controlled through suitable gearing (not shown) by shaft 72. Shaft 54 is affixed to north-south alignment control knob 56 which provides for simultaneous equal displacements of the north-south playback heads in opposite directions from their predetermined zero position. Hence, the potential at center arm $C_1$ provides a direct-current voltage proportional to the difference in time of arrival of the sound wave front from the north microphone to the south microphone when the signals are aligned on cathode ray tube 80 as hereinabove described. Similarly, since shaft 72 is affixed to east-west alignment knob 74, the potential at center arm $C_2$ of east-west potentiometer $P_2$ provides a direct-current voltage proportional to the difference in time of arrival of the sound wave front from the east microphone to the west microphone when the signals are aligned on cathode-ray tube 80. When the respective potentials at $C_1$ and $C_2$ are vectorially added, the resultant will provide an azimuth measurement of the sound wave. It is to be assumed, of course, that when the north-south playback heads are in their predetermined zero positions, the center arms $C_1$ and $C_2$ are at the zero voltage or ground positions on their respective potentiometers. With switches 93 and 95 now positioned as shown by the dotted lines, the horizontal and vertical plates of cathode-ray tube 80 are connected respectively to potentiometer center arms $C_2$ and $C_1$. Thus, with the four traces aligned as hereinabove described and the switches 93 and 95 in the dotted line positions, the voltage at $C_1$ is applied to the vertical plates of cathode-ray tube indicator 80 and the voltage at $C_2$ is applied to the horizontal plates of cathode-ray tube 80. The cathode-ray tube trace will now be positioned in accordance with the vector sum of the two direct-current voltages applied from $C_1$ and $C_2$ to provide the azimuth measurement of the sound wave. A suitable azimuth scale may be provided around the face of the cathode-ray tube and an alidade reader also provided to correctly read the azimuth position represented by the dot appearing on the face of the cathode-ray tube indicator 80. This cathode ray tube indicator presentation is shown at 80' which is shown in dashed lines to illustrate the point that 80 and 80' are one and the same cathode-ray tube indicator.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a sound ranging system having a cruciform microphone array and adapted to record the arrival of sounds wherein the azimuth is a function of the relative angular displacement of two pairs of playback heads, and including a cathode-ray tube indicator and means for presenting the discrete outputs of said playback heads on said cathode-ray tube indicator such that when said outputs are aligned on said cathode-ray tube indicator, the amounts of the relative angular displacements of each pair of said playback heads are proportional to the difference in time of arrival of a sound wave front to the individual microphone of said array; an electrical computer for converting said relative displacements to a reading of azimuth of sound arrival on said cathode-ray tube indicator comprising: discrete means responsive to the respective angular displacement of said pairs of playback heads whereby there are produced discrete direct-current potential proportional respectively to the relative angular displacement of said one pair of playback heads, and the relative angular displacement of said other pair of playback heads, and switch means for applying said discrete direct-current potentials to said cathode-ray tube after said alignment is produced thereon whereby the vector sum of said two discrete potentials is presented on said cathode-ray tube indicator to indicate the azimuth of sound arrival.

2. In a sound ranging system having a cruciform microphone array and adapted to record the arrival of sound wherein the azimuth of a sound wave front in a function of the relative angular displacement of two pairs of playback heads, the angular displacement of one pair of playback heads being produced by a first rotatable shaft and the angular displacement of the other pair of playback heads being produced by a second rotatable shaft, and further including a cathode-ray tube indicator and means for presenting the discrete outputs of said playback heads on said cathode-ray tube indicator such that when said outputs are aligned on said cathode-ray tube indicator the amounts of the relative angular displacement of each pair of said playback heads is proportional to the difference in time of arrival of a sound wave front to the individual microphones of said array; an electrical computer for converting said relative displacements to a reading of azimuth of sound arrival on said cathode-ray tube indicator comprising: discrete means responsive to said first and second rotatable shafts, respectively, whereby there are produced two discrete direct-current potentials, one of said potentials being proportional to the relative angular displacement of said one pair of playback heads, and the other of said potentials being proportional to the relative angular displacement of the other pair of playback heads when said alignment is produced on the cathode-ray tube indicator, and switch means for applying said discrete potentials to said cathode-ray tube indicator after said alignment is produced thereon whereby the vector sum of said two discrete potentials is presented on said cathode-ray tube indicator to indicate the azimuth of sound arrival.

3. The system in accordance with claim 2 wherein said potential producing means comprises a first and second potentiometer having respective center arms driven by said first and second rotatable shafts and discrete sources of direct-current of equal value connected across each of said potentiometers such that the end terminals of said potentiometers are at equal but opposite direct-current potentials, the potentials derived from said first and second potentiometer center arms when said alignment is produced on said cathode-ray tube indicator being proportional respectively to the relative angular displacement of said one pair of playback heads and the relative angular displacement of said other pair of playback heads.

4. In a sound ranging system having a cruciform microphone array and adapted to record the arrival of sound wherein the azimuth of a sound wave front is a function of the relative angular displacement of two pairs of playback heads, the angular displacement of one pair of playback heads being produced by a first rotatable shaft and the angular displacement of the other pair of playback heads being produced by a second rotatable shaft, and further including a cathode-ray tube indicator having vertical and horizontal deflection plates and means in circuit with said horizontal and vertical deflection plates for presenting the discrete outputs of each of said playback heads on said cathode-ray tube indicator such that when said outputs are aligned on said cathode-ray tube indicator, the amount of the relative angular displacements of each pair of said playback heads are proportional to the difference in time of arrival of a sound wave front to the individual michophones of said array; an electrical computer for converting said relative displacements to a reading of an azimuth of sound arrival on said cathode-ray tube indicator comprising: a first and second potentiometer having respective center arms driven by said first and second rotatable shafts, discrete sources of direct-current, of equal value, connected across each of said potentiometers such that the end terminals of said potentiometers are at equal but opposite direct-current potentials, the potentials derived from said first and second potentiometer center arms when said alignment is produced on said cathode-ray tube indicator being proportional respectively to the relative angular displacement of said one pair of playback heads, and the relative angular displacement of the other pair of playback heads, and switch means for applying the discrete potentials at said center arms to said vertical and horizontal deflection plates, respectively, after said alignment is produced whereby the vector sum of said two discrete potentials is presented on said cathode-ray tube indicator to indicate the azimuth of sound arrival.

References Cited in the file of this patent
UNITED STATES PATENTS

| | | |
|---|---|---|
| 2,350,080 | Sproule | May 30, 1944 |
| 2,611,023 | Dunn | Sept. 16, 1952 |
| 2,793,320 | Patterson | May 21, 1957 |
| 2,932,002 | Keiser | Apr. 5, 1960 |